US011572236B2

(12) United States Patent
Simmons

(10) Patent No.: US 11,572,236 B2
(45) Date of Patent: Feb. 7, 2023

(54) CRATE TRANSPORTER

(71) Applicant: Simpro Handling Equipment Limited, Auckland (NZ)

(72) Inventor: Stephen Leslie Simmons, Auckland (NZ)

(73) Assignee: Simpro Handling Equipment Limited, Auckland (NZ)

( * ) Notice: Subject to any disclaimer, the term of this patent is extended or adjusted under 35 U.S.C. 154(b) by 0 days.

(21) Appl. No.: 17/021,480

(22) Filed: Sep. 15, 2020

(65) Prior Publication Data

US 2021/0130112 A1 May 6, 2021

(30) Foreign Application Priority Data

Nov. 5, 2019 (CA) .................................. CA 3060919

(51) Int. Cl.
*B65G 57/30* (2006.01)

(52) U.S. Cl.
CPC .... *B65G 57/303* (2013.01); *B65G 2201/0258* (2013.01); *B65G 2203/0233* (2013.01)

(58) Field of Classification Search
CPC .......... B65G 57/303; B65G 2201/0258; B65G 2203/0233; B62B 2203/44; B62B 3/0606; B62B 3/0618; B62B 3/0643; B66F 9/0755; B66F 9/07559; B66F 9/183
See application file for complete search history.

(56) References Cited

U.S. PATENT DOCUMENTS

| 4,809,881 A * | 3/1989 | Becker ................. | B65G 59/103 |
| | | | 141/172 |
| 4,909,412 A * | 3/1990 | Cerf ..................... | B65G 59/105 |
| | | | 221/1 |
| 10,358,301 B2 * | 7/2019 | Lykkegaard ........... | B65G 47/36 |
| 10,696,498 B2 * | 6/2020 | Schroeder ............ | B65G 57/165 |
| 2017/0233199 A1 * | 8/2017 | King .................... | B65G 57/303 |
| | | | 414/789.7 |
| 2019/0119049 A1 * | 4/2019 | King ................... | B66F 9/07559 |

OTHER PUBLICATIONS

Crate Wizard 3—The Universal Pedestrian Crate Stacker, Simpro (Nov. 4, 2019) https://www.youtube.com/watch?v=5zbxAtqyMJAUS6196106.

* cited by examiner

*Primary Examiner* — Lynn E Schwenning
(74) *Attorney, Agent, or Firm* — Emerson Thomson Bennett; Daniel A. Thomson

(57) ABSTRACT

Lifting machinery is often unable to securely hold onto stacked crates and this presents a safety hazard. The invention may be embodied by a crate lifter 1 comprising a support mast 3, a carriage 8 engaged with the mast and rollers 6, 7 that enable the lifter to be moved. The carriage has clamps 9 that move laterally to grip one or more crates 2 so that they can be moved by the carriage up and down the mast. The carriage has a keeper 14 arranged to swing in response to the clamps 9 engaging the crate 2, or the lowest crate to be moved if there is more than one, to bring a ledge 14*b* of the keeper 14 into engagement with that crate to prevent it dropping free from the carriage.

14 Claims, 5 Drawing Sheets

CRATE TRANSPORTER

FIELD OF INVENTION

This invention relates to a transporter for lifting and moving crates, for example a stack of bread crates.

BACKGROUND

Items such as loaves of bread are typically held for transport in a plastic crate. Each crate accommodates a number of loaves and assists them to be kept together for convenient transport or storage. Often crates are stacked on one another in a factory-bakery, a warehouse, a freight vehicle or a retail outlet. It can be problematic move stacked crates as lifting machinery is often not able to adequately hold on to them. If they are not held securely then crates may drop from the stack, which is inconvenient, not to mention a safety hazard.

OBJECT OF THE INVENTION

It is an object of at least preferred forms of the invention to go at least some way to addressing the above problem. While this applies to preferred embodiments it should be understood that the object of the invention in its broadest form is simply to provide a useful choice. Therefore any objects or advantages of preferred embodiments should not be read-into any claims expressed more broadly.

INTERPRETATION

The term "comprising" or derivatives thereof such as "comprises" when used in this document in relation to a combination of features should not be interpreted exclusively. In other words they indicate the minimum features present, without ruling out the option of additional unmentioned features. The 'features' may for example be physical items and/or action steps.

SUMMARY OF THE INVENTION

According to one aspect of the invention there is provided a crate lifter comprising:
  a) a main support mast (e.g. an upwardly extending frame),
  b) a carriage engaged with the mast and having:
    i. clamps adapted to move laterally with respect to the mast to grip one or more crates so that the crate(s) can be moved by the carriage up and down the mast; and
    ii. a keeper arranged such that it is caused to swing (eg pivot) in response to the clamps engaging the crate, or the lowest crate to be moved if there is more than one, to bring a portion of the keeper into engagement with that crate to prevent it dropping free from the carriage; and
  c) rollers (e.g. wheels or castors) at a base of the mast that enable the lifter to be moved from one location to another.

Optionally the keeper is arranged to engage with a space in, or a side rib of, the lowest crate to be moved.

Optionally the clamps are such that:
  a) they have resilient dimples (e.g. rubber domes) arranged to contact a crate engaged with the carriage to securely grip that crate; and/or
  b) they are biased towards a closed/clamping disposition by a series of gas struts until force from those struts is overcome by a hydraulic force that moves the clamps towards a non-clamping disposition.

Optionally the carriage has a sensor and the mast has a height trigger, or vice versa, these being arranged such that when the carriage moves along the mast to bring the sensor close enough to the trigger to detect it, or vice versa, movement of the carriage along the mast is automatically paused to provide a human operator with an opportunity to activate the clamps to engage a crate that is stacked on one or more other crates.

Optionally the mast is fitted with a height restrictor (e.g. a stack ceiling restrictor) arranged to engage with the highest crate in a stack until the restrictor reaches a predetermined maximum height at which point it causes the carriage to prevent further upward movement of the highest crate and therefore any crate(s) stacked under it.

Optionally the mast has a pair of feet arranged to prevent the lifter from tipping forward.

Optionally the lifter has wheels arranged to provide a triangular three point only contact with the ground.

Optionally the lifter comprises a tiller extending upwards from one of the wheels and able to be turned by hand to steer the lifter when moving one or more crates.

DRAWINGS

Some preferred embodiments of the invention will now be described by way of example and with reference to the accompanying drawings, of which:

DETAILED DESCRIPTION

Figure 1:
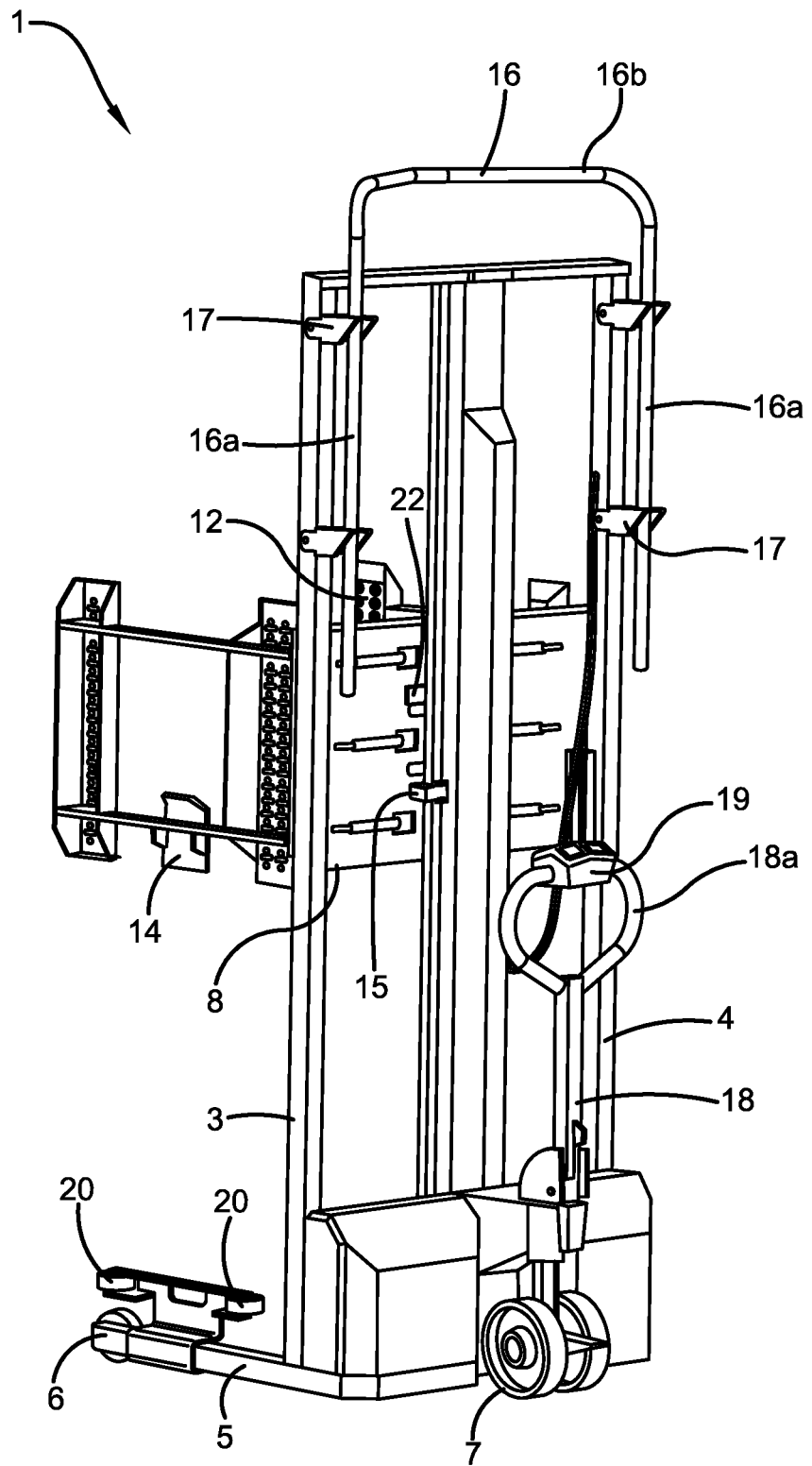
FIG. 1 is a rear isometric view of a crate lifter for use with a stack of bread crates.
Figure 2:
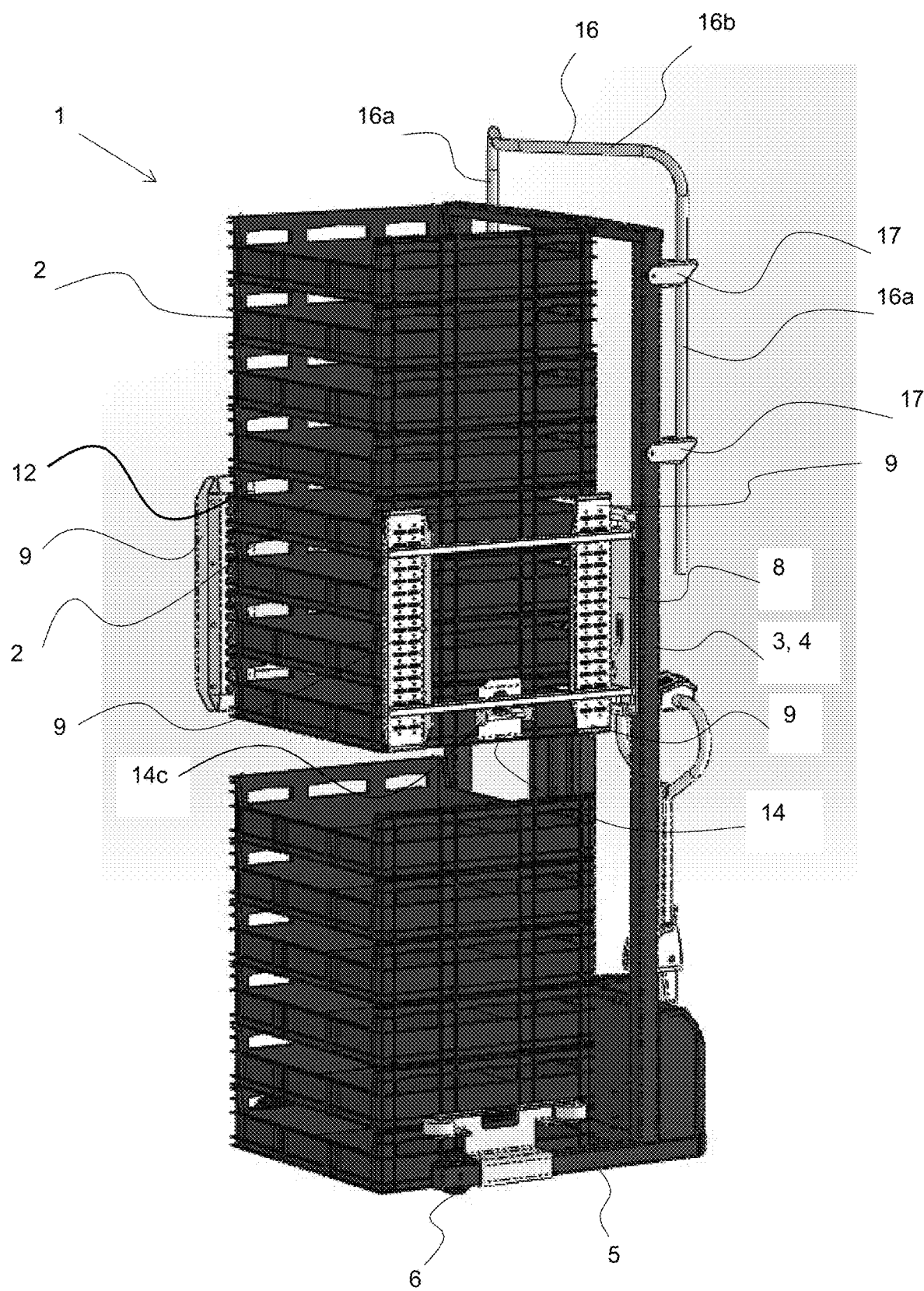
FIG. 2 is side isometric view of the lifter when engaged with a stack of bread crates.
Figure 3:
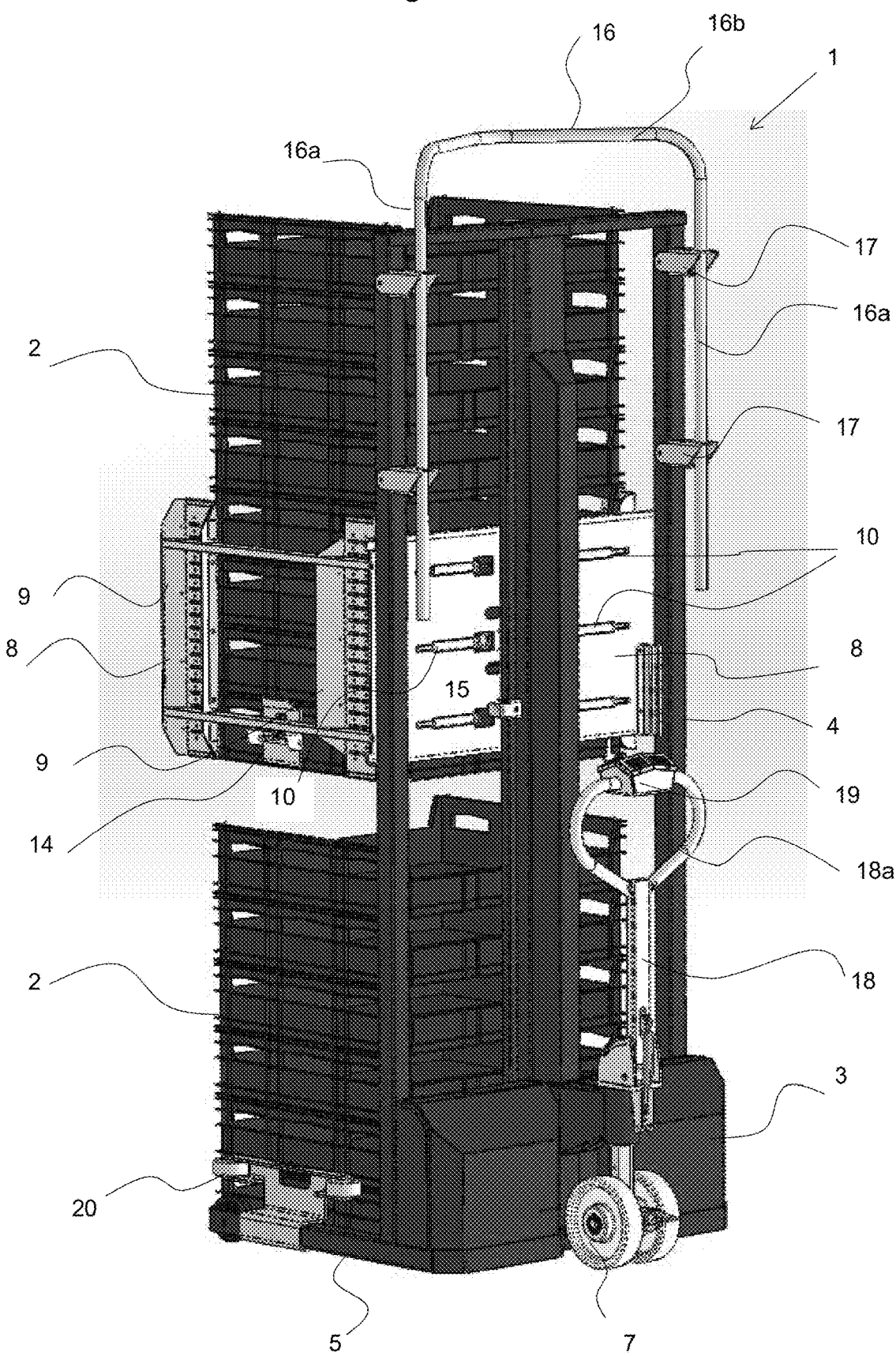
FIG. 3 is rear isometric view of the lifter when engaged with the stack.

Referring to FIGS. 1-3, the crate lifter 1 is formed of a suitable size for carrying a stack of bread crates 2. In FIGS. 2 and 3 the stack is shown just after it has been split in two. Preferably the lifter can accommodate a stack of at least 18 crates. The lifter 1 has a vertically extending mast 3, in this case in the form of an upwardly extending steel frame 4 with a pair of forwardly extending legs 5. The legs 5 help to stop the lifter tipping forwards when it is used to carry a heavy load of crates, each laden with multiple loaves of bread.

The mast 3 is fitted with wheels 6, 7. As shown, the two smaller wheels 6 are at the legs respectively, and the larger wheels 7 are at the rear base of the mast. The wheels 6, 7 are the only points of contact between the lifter 1 and the ground. They provide a stable triangular ground-engaging configuration (the two wheels 7 can be regarded as one point of contact seeing as they are very close together).

The lifter 1 has a carriage 8 which can be driven up the mast for raising one or more of the crates 2, and subsequently lowered. Lowering of the carriage 8 can be mechanically driven, or alternatively the carriage can be allowed to lower in a slowed and controlled manner under the force of gravity. Preferably the lifting and lowering is achieved by a hydraulically powered chain drive.

Figure 4:
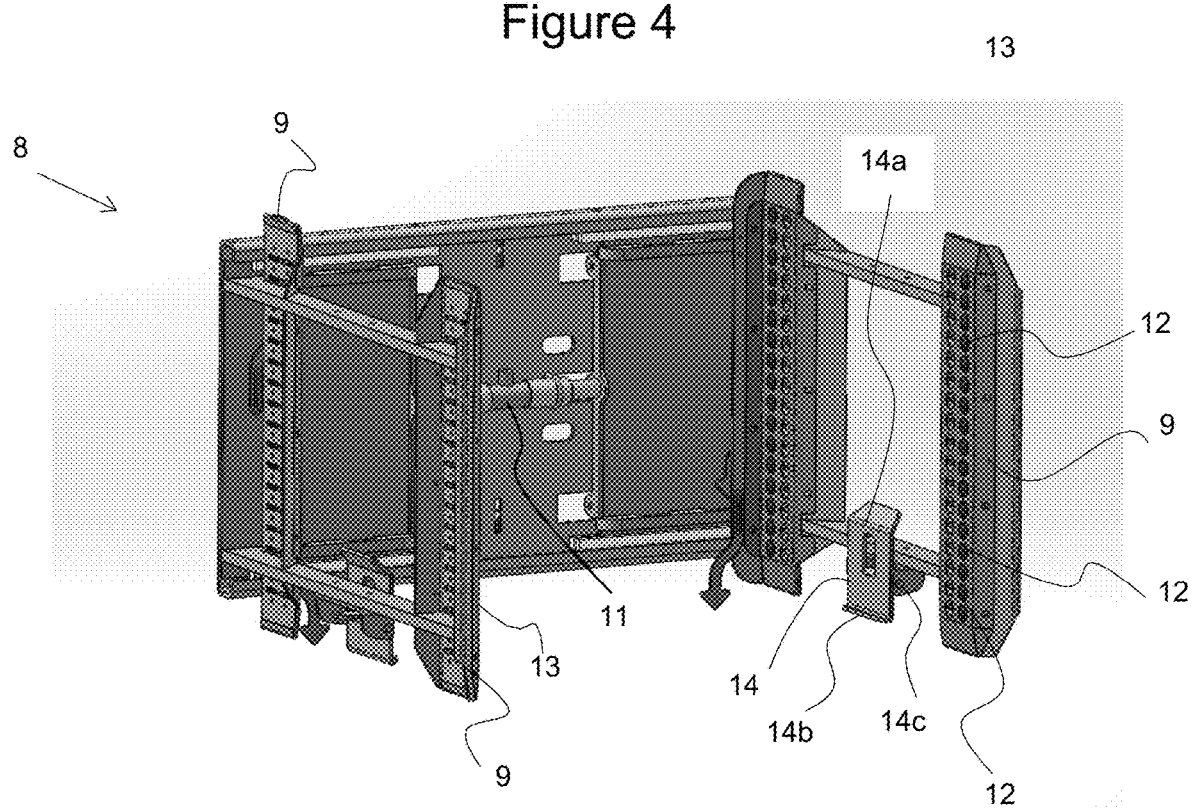
FIG. 4 is a front isometric view of a carriage forming part of the lifter.
Figure 5:
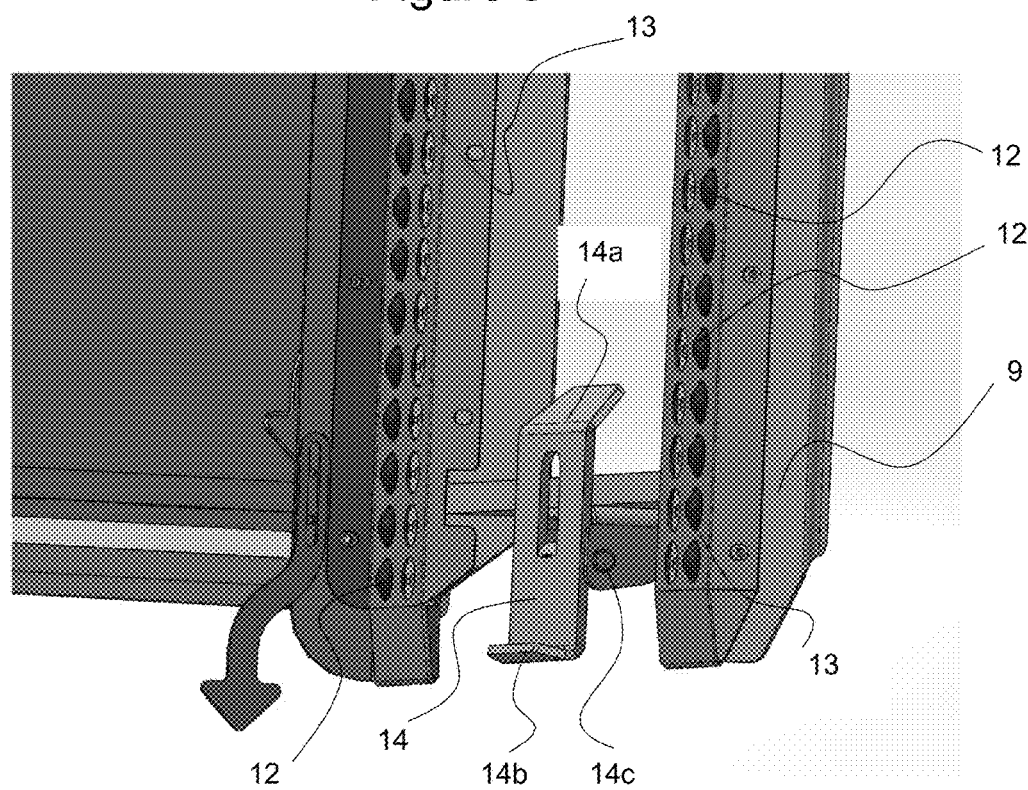
FIG. 5 is an isometric view showing detail of the carriage.
Figure 6:
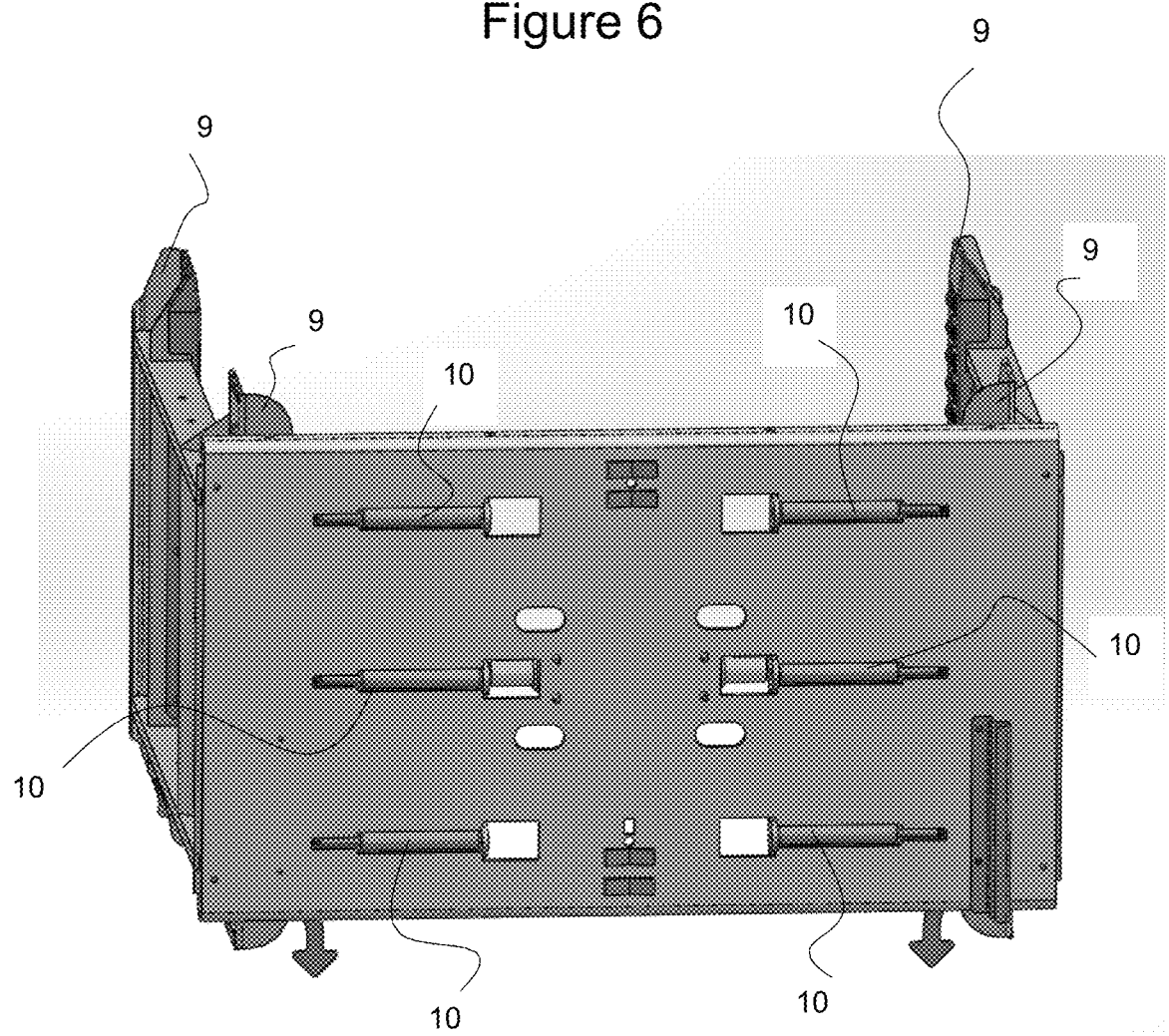
FIG. 6 is a rear isometric view of the carriage.

Referring to FIGS. 4-6, the carriage has clamps 9 at each side and these are biased to move towards one another in a clamping action under the pressure of six gas struts 10 (see FIG. 6). Therefore once a crate or a stack of crates is clamped, there is a constant lateral squeeze pressure against them to help prevent them from falling away from the carriage 8. When the lifter has moved a stack of the crates 2 to the desired location the stack is lowered to ground level, and the clamps 9 are then released so that the lifter can be withdrawn.

Release of the clamps is caused by a hydraulic ram 11 (see FIG. 4). In this regard when the ram 11 receives a fill of hydraulic oil it pushes the clamps apart to overcome the gas struts 10, and thereby open the carriage 8. The ram 11 can be caused to subsequently release hydraulic oil so that the clamps 9 are once again subject to the force of the gas struts 10 and closed.

As shown in FIG. 5, the inner faces of the clamps 9, being the parts that press against bread crates directly, have a plurality of resilient dimples 12. In the preferred embodiment, the dimples are rubber domes and they protrude from a rubber sheet-like base through apertures in protective metallic plates 13. The resilience of the dimples 12 helps to provide a more secure grip between the clamps 9 and the crates 2 they engage. This assists the clamps 9 to stay fast against the crates 2 even if the contour of the crates is uneven or irregular. This is particularly useful as different bread crate manufactures use different crate profiles and sometimes crates from different manufacturers are mixed in the same stack.

As shown in FIGS. 2-3, to lift a stack of crates the lifter is maneuvered so that the clamps 9 are either side of at least the lowest bread crate to be moved in a stack.

The clamps are caused to move towards one another so that that crate is clamped. While the clamping force is significant, as a failsafe the carriage has keepers 14, one at each side. With particular reference to FIGS. 4-5, when at rest an upper part 14a of each keeper protrudes (eg leans) inwards with respect to the neighbouring clamps so that it butts against the lowest crate to be moved just before the clamps 9 contacts that crate. This butting movement causes the keeper 14 to pivot about a pin 14c so that a lower ledge 14b of each keeper swings forward and hooks into a space in the side of, or hooks under, the lowest crate to be moved. Alternatively the ledge 14b may pivot to a position under and against a side rib of the crate. In other embodiments alternative modes of engagement of the ledge 14b with the lowest crate to be moved may be adopted. In this way the ledge 14b provides a lower barrier to prevent the lowest crate to be moved from dropping out of the carriage 8. As will be appreciated, as the lower ledge 14b of the keeper swings forward the upper part 14a of the keeper swings back. The ledge 14b is prevented from pivoting back to its original resting position by the force of the clamps 9 against the lowest crate to be moved. But when the clamps 9 are subsequently opened, the keeper 14 pivots back under gravity to its rest position so that the ledge 14b no longer engages that crate.

Referring to FIGS. 1 and 3, the mast 3 is fitted with a metallic trigger 15 that can be adjusted to sit at various heights along the mast. This is detected by a magnetic sensor 22 fitted to the carriage 8. When the carriage moves the sensor 22 into proximity with the trigger, vertical movement of the carriage is automatically stalled, for example for 2-5 seconds. This may be achieved by a stall signal being sent to the mechanical drive mechanism that causes upwards and downwards movement of the carriage. What the pause does is give a human operator a prompt, and time, to activate controls to cause the clamps 9 to engage of disengage the crate at the corresponding vertical position of the stack. For example the clamps 9 may be caused to clamp at just the right place for grabbing the $7^{th}$ crate in a stake. This enables that crate, and any higher crates, to be collectively moved up and away from the lower crates in the stack. Therefore the lifter can be used in this way to grab and subsequently move the selected top few crates in a stack, or in other words conveniently split the stack. In some alternative embodiments the trigger may be on the carriage and the sensor 22 on the mast.

Referring to FIGS. 1-3, a height restrictor bar 16 is fitted to the top of the mast 3. In this case it is generally 'Π' shaped but the top of it bends forward so it is positioned over stacked crates. As the stack of crates moves upwards, the highest crate butts into and under the bar 16 and causes it to move upwards in unison. When the bar 16 gets to a predetermined height a stop switch is triggered to prevent further upward movement of the carriage and therefore the stack. The stop switch can be adjusted, for example, to make sure that the stack never gets lifted higher than, say, an 18 crate stack, or whatever other height is deemed to be safe.

More specifically, the height restrictor bar has two side arms 16a and these slide up and down within support brackets 17 extending from the mast 3. The cross bar 16b of the restrictor makes contact with the highest crate in an upwardly moving stack. Again, this is possible because the cross bar 16b curves from behind the mast to a position slightly over the stack in front of the mast.

Referring to FIGS. 1 and 3, the large ground engaging wheels 7 are at the base of a hand operated tiller 18. A handle 18a of the tiller can be turned to move the wheels 7 for steering the lifter as it is moved with or without a stack of crates. The handle 18a is fitted with a controller device 19 than can be used by a human operator to activate and control upwards and downwards movement of the carriage, and closing and opening movement of the clamps.

In some instances a stack of crates may be set on dolly wheels (not shown) slightly above ground level, although in other instances in may be sitting directly on the ground. In either case the stack should be considered to be more or less at ground level. To assist in manipulating the lifter so that its clamps are either side of a stack, the mast's forward legs have guide rollers 20, one at each side. These are preferably moved if the stack is directly at ground level.

In terms of disclosure, this document hereby anticipates and disclosures any feature mentioned herein in combination with any one or more other features mentioned herein, even if such combination is not the subject of a claim.

While some preferred forms of the invention have been described by way of example it should be understood that modifications and improvements can occur without departing from the scope of the following claims.

The invention claimed is:

1. A crate lifter comprising:
   a) a main support mast,
   b) at least one crate;
   c) a carriage engaged with the mast and having:
      i. clamps adapted to move laterally with respect to the mast to grip the crate so that the crate can be moved by the carriage up and down the mast; and
      ii. a plurality of keepers, each keeper being arranged on a respective one of the clamps such that an upper part of the keeper is adapted to protrude inwardly from the clamp and butt against the crate so that, because of such butting, movement of the clamp towards the crate drives pivoting of the keeper with respect to the clamp such that a lower edge of the keeper swings inwards and engages the crate, so that the crate is prevented from dropping free from the carriage; and
d) rollers at a base of the mast that enable the lifter to be moved from one location to another.

2. A crate lifter according to claim 1, wherein the keeper is arranged to engage with a space in, or a side rib of, the crate.

3. A crate lifter according to claim 2, wherein the clamps are such that:
a) they have resilient dimples arranged to contact the crate when engaged with the carriage to securely grip crate; and/or
b) they are biased towards a closed/clamping disposition by a series of gas struts until force from those struts is overcome by a hydraulic force that moves the clamps towards a non-clamping disposition.

4. A crate lifter according to claim 3, wherein the carriage has a sensor and the mast has a height trigger, or vice versa, these being arranged such that when the carriage moves along the mast to bring the sensor close enough to the trigger to detect it, or vice versa, movement of the carriage along the mast is automatically paused to provide a human operator with an opportunity to activate the clamps to engage the crate when stacked on one or more other crates.

5. A crate lifter according to claim 4, wherein the mast is fitted with a height restrictor arranged to engage with the highest crate in a stack until the restrictor reaches a predetermined maximum height at which point it causes the carriage to prevent further upward movement of the highest crate in the stack and therefore any crate(s) stacked under it.

6. A crate lifter according to claim 5, wherein the mast has a pair of feet arranged to prevent the lifter from tipping forward.

7. A crate lifter according to claim 6, comprising wheels arranged to provide a triangular three point only contact with the ground.

8. A crate lifter according to claim 7, wherein the lifter comprises a tiller extending upwards from one of the rollers/wheels and that is able to be turned by hand to steer the lifter when moving one or more crates.

9. A crate lifter according to claim 1, wherein
a. the keeper is arranged to engage with a space in, or a side rib of, the crate to;
b. the clamps are such that:
i. they have resilient dimples arranged to contact the crate when engaged with the carriage to securely grip that crate; and/or
ii. they are biased towards a closed/clamping disposition by a series of gas struts until force from those struts is overcome by a hydraulic force that moves the clamps towards a non-clamping disposition;
c. the carriage has a sensor and the mast has a height trigger, or vice versa, these being arranged such that when the carriage moves along the mast to bring the sensor close enough to the trigger to detect it, or vice versa, movement of the carriage along the mast is automatically paused to provide a human operator with an opportunity to activate the clamps to engage the crate that is stacked on one or more other crates;

d. the mast is fitted with a height restrictor arranged to engage with a highest of the stacked crates the restrictor reaches a predetermined maximum height at which point it causes the carriage to prevent further upward movement of the highest crate and therefore any crate(s) stacked under it;
e. the mast has a pair of feet arranged to prevent the lifter from tipping forward;
f. the crate lifter comprises wheels arranged to provide a triangular three point only contact with the ground; and
g. the lifter comprises a tiller extending upwards from one of the rollers/wheels and that is able to be turned by hand to steer the lifter when moving one or more crates.

10. A crate lifter according to claim 1, formed such that when each keeper is in a resting position a contact part of the keeper leans inwards so that when in use it butts against the crate just prior to the clamps contacting the crate, the keeper being formed so that the butting contact causes the keeper to pivot so that the keeper swings to hook the crate and wherein when in that position the keeper is prevented from pivoting back to its resting position by reason of force of the clamps against the crate, but wherein the keeper pivots under gravity back towards its resting position when the clamps are opened.

11. A crate lifter according to claim 10, wherein the contact part of the keeper is above a pivot connection of the keeper.

12. A crate lifter according to claim 11, wherein the pivot connection comprises a pin.

13. A crate lifter according to claim 10, wherein the keeper comprises a ledge at a lower portion of the keeper arranged to enable said hooking of the crate.

14. A crate lifter comprising:
a) a main support mast;
b) a carriage engaged with the main support mast and having:
i. clamps adapted to move laterally with respect to the mast to grip one or more crates so that the crate(s) can be moved by the carriage up and down the mast; and
ii. a keeper arranged such that it is caused to swing in response to the clamps engaging the crate, or the lowest crate to be moved if there is more than one, to bring a portion of the keeper into engagement with that crate to prevent it dropping free from the carriage wherein:
each keeper is arranged such that when it is in a resting position a contact part of the keeper leans inwards so that when in use it butts against the crate just prior to the clamps contacting the crate, the keeper being formed so that the butting contact causes the keeper to pivot such that the keeper swings to hook the crate and wherein when in that position the keeper is prevented from pivoting back to its resting position by reason of force of the clamps against the crate, but wherein the keeper pivots under gravity back towards its resting position when the clamps are opened; and
c) rollers at a base of the mast that enable the lifter to be moved from one location to another.

* * * * *